Nov. 9, 1965  A. L. NASVYTIS  3,216,270
PLANETARY GEAR-ROLLER

Filed Nov. 14, 1962  2 Sheets-Sheet 1

INVENTOR.
Algirdas L. Nasvytis
BY
Hill, Sherman, Meroni, Gross & Simpson
ATTORNEYS

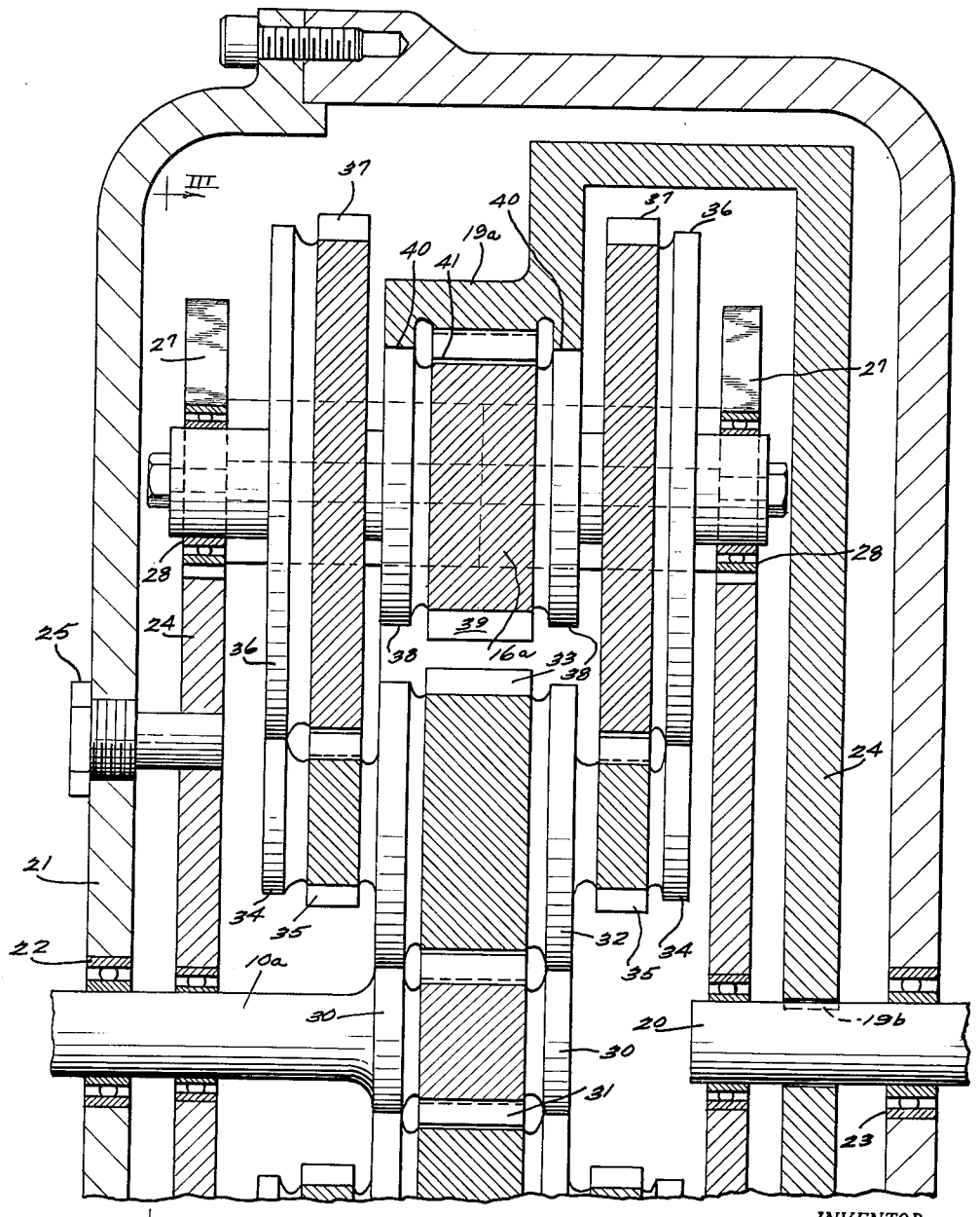

United States Patent Office 3,216,270
Patented Nov. 9, 1965

3,216,270
PLANETARY GEAR-ROLLER
Algirdas L. Nasvytis, Cleveland, Ohio, assignor to
TRW Inc., a corporation of Ohio
Filed Nov. 14, 1962, Ser. No. 237,630
4 Claims. (Cl. 74—410)

The present invention relates to improved planetary type transmission apparatus and is, more particularly, concerned with the provision of an improved high ratio gearing system in which the bearings are greatly simplified and in which the torque capacity of the transmission system is very substantial.

In my copending application Serial No. 132,406, filed August 18, 1961, and in my copending application Serial No. 237,629, filed concurrently herewith entitled "Toggle Action Planetary Friction Device," I have described improved planetary type drives. In the apparatus there shown, the elements are entirely of the friction type. In accordance with the drives there shown and in accordance with simple planetary gear systems heretofore known, reduction ratios of more than 12 or 15 to 1 were very difficult to achieve in a single plane without the provision of extremely large ring gear elements. As a result, when high gear reduction was considered, several stages of planetary gear units were considered necessary. In accordance with the present invention, however, reduced weight with high torque and high ratio are simultaneously accomplished through utilization of a combination roller-positive gear planetary system of extremely simple and yet highly efficient configuration. Thus, while in prior constructions high load, high ratio planetary systems have ordinarily required heavy bearing configuration, as well as a plurality of stages, and a resultant relatively heavy total weight, the drive system of the present invention does not.

Additionally, the advantages above mentioned have been achieved with a relatively silent transmission system in which the gear members in proper parallel alignment are constantly in contact with each other thereby providing a well damped gearing system employing very high torque capabilities. Also, the gear members are rolling on exact pitch diameter thereby providing higher efficiency and longer life expectancy.

In accordance with the present invention, multiple planetary rollers are provided in plural torque-transmitting paths between the sun gear member and the ring gear member. These multiple paths comprise a plurality of combination roller and gear intermediate members arranged so that all of them have a balanced pressure and are simultaneously positively maintained in a predetermined relationship relative to each other without the necessity for fixed shaft bearings or the like.

In the system of the present invention a drive is provided in which the major part of the force transmission is through toothed gearing. In accordance with the present invention the tangential forces of the drive system are transmitted through toothed gears while the relative positions of the gears and their relative alignment are maintained by smooth surfaced roller or friction elements having their respective diameters equal to the associated gear pitch diameters so that the rollers will rotate with respect to each other without slippage. This relationship simultaneously maintains all of the parts in their proper relative radial positions without the necessity for fixed bearing elements. At the same time, it will be clear that in accordance with this configuration, shorter axial length of the several drive components is possible while at the same time, relatively high torque transmission is accomplished.

It is, accordingly, an object of the present invention to provide an improved multiple gear-roller drive system.

Still a further object of the present invention is to provide a balanced multiple roller drive system wherein the rollers are positioned between the sun and the ring in a positive manner such that locating bearings may be eliminated while at the same time extremely high positive torque transmission is provided.

Still another feature of the invention resides in the provision of a combined roller and toothed gearing assembly in which the rolling arrangement provides proper gear positioning while the gear teeth provide high torque transmission capability.

Still other and further objects and features of the present invention will at once become apparent to those skilled in the art from a consideration of the attached drawing wherein two embodiments of the present invention are shown by way of illustration only, and wherein:

FIGURE 2 is an elevational view in cross-section taken along the line II—II of FIGURE 1.

As shown on the drawings:

Figure 1:
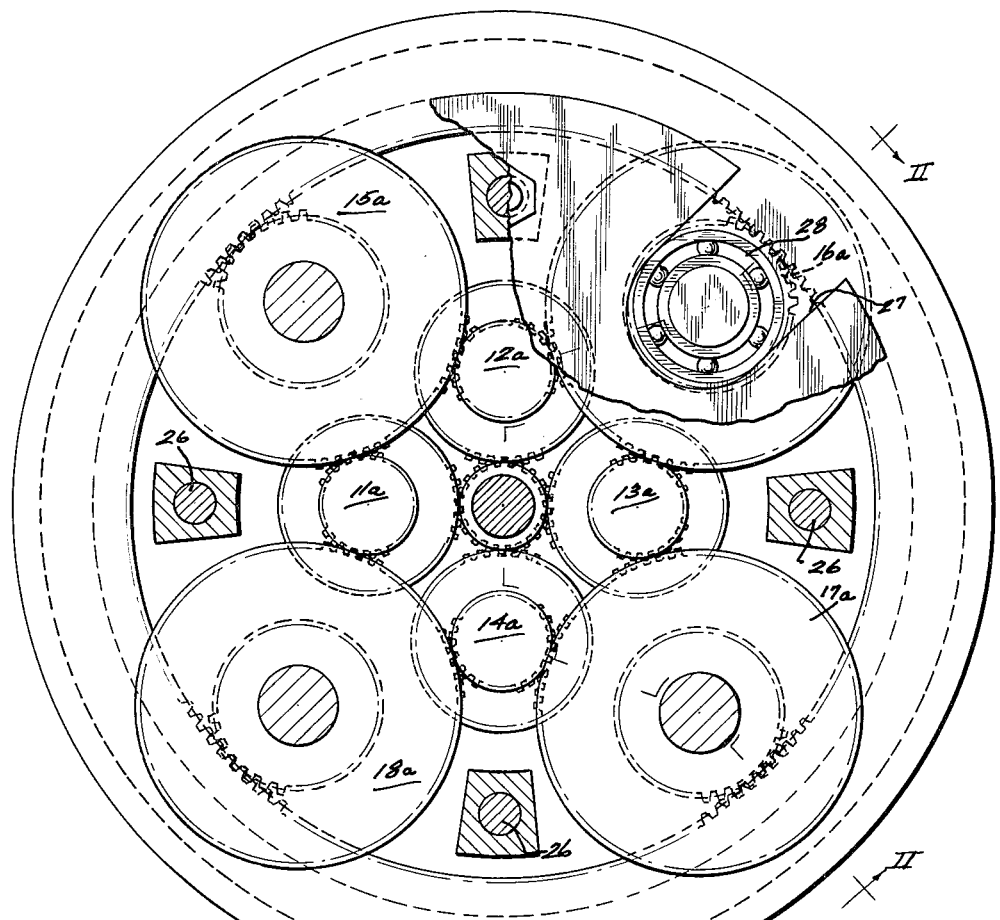
FIGURE 1 is an end elevational view of a drive system in accordance with the present invention wherein roller and positive gear elements are employed.

As may be seen from a consideration of the drawings and particularly with reference to the first embodiment illustrated in FIGURES 1 and 2, a drive system is illustrated in which the sun element is deginated 10a, the first intermediate system members are designated 11a, 12a, 13a, and 14a and second intermediate system elements are designated 15a, 16a, 17a and 18a. A ring element 19a is drivingly splined at 19b to an output shaft 20 and the entire assembly is enclosed within a main housing 21. As may be seen, the housing 21 is provided with bearings 22 for supporting the input, or sun member 10a, and is provided with bearings 23 for supporting the output shaft 20. The two sets of intermediate members are, due to their geometry, rotatable on axes that are fixed relative to each other at all times. These axes may be simultaneeously held fixed in place by a fixed carrier member 24 angularly fixed relative to the housing 21 by means of a screw abutment 25 or the like. As illustrated, carrier 24 has front and back plates secured by through bolts 26, illustrated in FIGURE 1, and has radial slots 27 in which slipper bearings 28 are mounted for radial freedom. This radial freedom permits relatively simple assembly and, as will be apparent, the balanced geometry of the device maintains all of the parts in parallel relation so that no radial load must be carried by the bearings 28.

As will be seen, the sun member 10a is provided with smooth roller, surfaces 30 and gear teeth 31 which cooperate respectively with the roller surfaces 32 and gear teeth 33 of the first intermediate members 11a, 12a, 13a, and 14a. Similarly, the first intermediate members 11a, 12a, 13a, and 14a carry roller surfaces 34 and gear teeth 35 for co-operation with the respective roller surfaces 36 and gear teeth 37 on the second intermediate members 15a, 16a, 17a, and 18a. The second intermediate members in turn, carry roller surfaces 38 and gear teeth 39 for co-operation with the respective roller surfaces 40 and gear teeth 41 on the ring member 19a.

It will thus be observed from the FIGURES 1 and 2, that each of the gear members in the system is axially positively aligned with its driving and driven members by means of a pair of spaced, smooth roller surfaces. Additionally, these points of contact are three in number and less than 180° apart. Accordingly, the positioning of the individual intermediate members positively positions all of the parts relative to each other and all of the intermediate elements are balanced with their lateral loads balanced relative to their axes. In the circumstances, the only loads applied by the bearings 28 to the slotted supports 24 are peripheral loads associated with the reaction torque of the drive while the members 11a, 12a, 13a, and 14a require no bearings at all to provide and maintain proper axial alignment. In this connection it will be noted that the bearings 28 could, if desired, be associated with the rollers 11a, 12a, 13a, and 14a, instead of rollers 15a, 16a, 17a, and 18a since these two sets of intermediate members both stay fixed in space in the embodiment illustrated in FIGURES 1 and 2. Similarly, in planetary systems in which the output shaft is driven by the planet carrier or device carrying the intermediate members, and the ring gear is fixed, both the first and second sets of intermediate members will planetate together so that in any event, either the reaction torque or output torque may be transmitted by a set of bearings associated with either the first or the second set of intermediate or planetary rollers.

Figure 3:
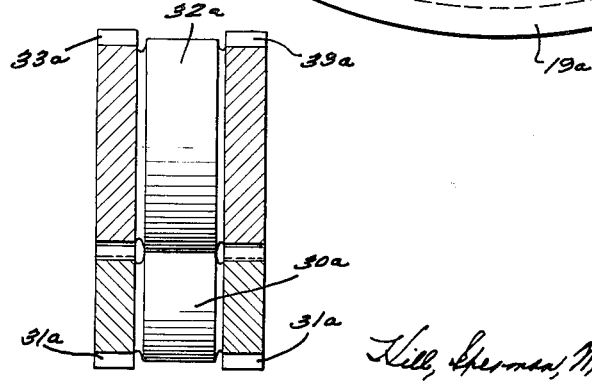
FIGURE 3 is a modified form of combined roller and positive gear elements in accordance with the present invention.

As may be seen from a consideration of FIGURE 3, axial alignment, as well as balanced positioning, may be achieved through employment of rolling surfaces placed between the positive gear teeth. Thus, for example, the rolling surfaces 30a and 32a may be provided between their respective gear teeth 31a and 33a.

In considering the embodiments of the invention illustrated in FIGURES 1, 2 and 3, it will be noted that the smooth surfaces of each roller member are constructed at the pitch diameter of the associated gear. As a result of this arrangement, no sliding is provided between respective drive elements. In driving operation, the tangential and torque loads are taken by the gear teeth and the rolling contacts are preloaded very lightly, sufficiently to overcome reaction forces on the gear tooth contacts. With such a relationship, the smooth roller surfaces actually operate mainly as positioning surfaces thereby eliminating bearing elements of the type heretofore employed. Such prior art types of bearing elements have materially increased the total weight of constantly engaged gear drive systems and the elimination thereof in accordance with the present invention has provided an unusually light drive system capable of handling very high loads. Additionally, constant contact between the respective gear members by both smooth contacting surfaces, as well as gear surfaces, helps to dampen any vibratory forces in the system, thereby reducing the noise level.

It will be apparent to those skilled in the art, further, that by elimination of the bearings, the intermediate roller gears can be made of very small size compared to those of ordinary systems, in which bearing size is dictated by r.p.m. and load characteristics.

As those skilled in the art are further aware, variations and modifications may be made in the structures forming the illustrated embodiments of the present invention without departing from the novel concepts of the invention. For example, the friction gearing systems of my copending applications mentioned above may readily be constructed with the roller-gear system described herein. It is, accordingly, my intention, that the invention be limited solely by the scope of the hereinafter appended claims.

I claim as my invention:

1. In combination in a drive system, a sun cylinder member, a ring cylinder member, a set of intermediate gear members comprising more than two cylinders equally spaced around said sun cylinder, and additional intermediate gear members drivingly interposed between the members of said set and said ring cylinder, at least two of said additional intermediate members co-operating with each intermediate member of said set to position without bearings said set members positively in space relative to each other and the additional intermediate members, each of said members comprising a positive gear and a rolling surface coaxially positioned at axially spaced points and having the same pitch diameter.

2. In combination in a drive system, a sun cylinder member, a ring cylinder member, a set of intermediate gear members comprising more than two cylinders equally spaced around said sun cylinder, and additional intermediate gear members drivingly interposed between the members of said set and said ring cylinder, two of said additional intermediate members drivingly contacting each intermediate member of said set and said members of said set simultaneously contacting said sun cylinder whereby each intermediate member of said set drivingly contacts other members at three spaced points to thereby be positively positioned without bearings in space relative to the other intermediate members of said set, each of said intermediate members comprising torque-balanced axially space coaxial gear tooth and rolling surfaces of identical pitch diameter.

3. The drive system set forth in claim 2 wherein each of said intermediate members comprises axially spaced coaxial gear toothed surfaces separated by a smooth cylindrical roller surface having a diameter equal to the pitch diameter of said toothed surfaces.

4. The drive system in accordance with claim 2 wherein each of said intermediate members comprises axially spaced coaxial smooth cylindrical roller surfaces separated by a gear toothed surface having a pitch diameter equal to the diameter of said roller surfaces.

References Cited by the Examiner

UNITED STATES PATENTS

| | | | |
|---|---|---|---|
| 751,588 | 2/04 | Westinghouse | 74—801 |
| 1,117,446 | 11/14 | Rodefeld | 74—798 |
| 1,970,251 | 8/34 | Rossman | 74—801 |
| 2,516,077 | 7/50 | Schmitter | 74—410 |
| 3,144,790 | 8/64 | Davis et al. | 74—801 |

FOREIGN PATENTS

| | | |
|---|---|---|
| 53,682 | 9/37 | Denmark |
| 269,904 | 12/27 | Great Britain. |
| 485,820 | 11/17 | France. |

DON A. WAITE, *Primary Examiner.*